US008717561B2

(12) United States Patent
Ko

(10) Patent No.: US 8,717,561 B2
(45) Date of Patent: May 6, 2014

(54) MINIATURE SPECTROMETER WITH STRAY LIGHT FILTERING STRUCTURE

(75) Inventor: Cheng-Hao Ko, Hsinchu County (TW)

(73) Assignee: OtO Photonics, Inc. (TW)

( * ) Notice: Subject to any disclaimer, the term of this patent is extended or adjusted under 35 U.S.C. 154(b) by 0 days.

(21) Appl. No.: 13/642,222

(22) PCT Filed: Apr. 19, 2010
(Under 37 CFR 1.47)

(86) PCT No.: PCT/CN2010/071873
§ 371 (c)(1),
(2), (4) Date: Oct. 19, 2012

(87) PCT Pub. No.: WO2011/130899
PCT Pub. Date: Oct. 27, 2011

(65) Prior Publication Data
US 2013/0314704 A1 Nov. 28, 2013

(51) Int. Cl.
G01J 3/28 (2006.01)
(52) U.S. Cl.
USPC .......................................... 356/328
(58) Field of Classification Search
USPC ........................ 356/326, 328, 334
See application file for complete search history.

(56) References Cited

U.S. PATENT DOCUMENTS 7,916,292 B2 * 3/2011 Konno et al. ................. 356/328

FOREIGN PATENT DOCUMENTS

| CN | 101295050 A | 10/2008 |
| JP | 9-318802 | 12/1997 |
| JP | 2008185525 | 8/2008 |
| TW | 200907309 | 2/2009 |
| TW | M370071 | 12/2009 |

* cited by examiner

Primary Examiner — Tarifur Chowdhury
Assistant Examiner — Abdullahi Nur
(74) Attorney, Agent, or Firm — Han IP Corporation

(57) ABSTRACT

A miniature spectrometer comprises an input unit, a stray light filtering structure, and a miniature diffraction grating. The input unit receives a first optical signal and a second optical signal. The stray light filtering structure has first and second filter sections to filter out the second optical signal. The first and second filter sections have first and second dentate structures disposed on opposite sides. The first and second dentate structures define an optical channel for the transmission of the first optical signal. The second optical signal enters into the first or the second dentate structure and is filtered out by the first or the second dentate structure. The miniature diffraction grating receives the first optical signal from the stray light filtering structure and separates the first optical signal into a plurality of spectral components.

20 Claims, 6 Drawing Sheets

MINIATURE SPECTROMETER WITH STRAY LIGHT FILTERING STRUCTURE

CROSS-REFERENCE TO RELATED APPLICATION

This application is the national phase application of international application number PCT/CN2010/071873, filed on Apr. 19, 2010, which is incorporated by reference in its entirety.

TECHNICAL FIELD

The present invention relates to a spectrometer, and more particularly relates to a miniature spectrometer with a stray light filtering structure.

BACKGROUND

Photometry, or photometric measurement, of a radiation source is commonly carried out by spectrometers. A spectrometer uses a slit structure to control the amount of light entering the spectrometer, and uses a diffraction grating in combination with a collimator and a correcting lens to focus spectral components on an imaging plane. A photodetector can be placed on the imaging plane to detect each individual spectral component. However, the results obtained by the photodetector of the spectrometer with this configuration are not useful under certain conditions as a fairly high level of stray light tends to enter into the slit and reach the diffraction grating, thus affecting the result of diffraction grating. Accordingly, the light source needs to be well controlled, yet this limits the wide application of conventional spectrometers.

FIG. 6 is a schematic diagram of a conventional spectrometer 100. As shown in FIG. 6, the conventional spectrometer 100 includes a light source 110, an input unit 120, a collimating lens 130, a planar grating 140, a focusing lens 150, and a linear photodetector 160. An optical signal 200 emitted from the light source 110 enters into the spectrometer 100 through the input unit 120 and travels in free space. After collimation by the collimating lens 130, the optical signal 200 reaches the planar grating 140. The macroscopic profile of a diffraction pattern 142 of the planar grating 140 is a plane. The planar grating 140 is commonly produced by a traditional manufacturing method in which the diffraction pattern is formed by diamond ruling. However, with this manufacturing method, a diffraction grating with a curved surface that is capable of focusing light cannot be produced. Therefore, after the planar grating 140 separates the optical signal into multiple spectral components, a focusing lens 150 is necessary to focus the resulting spectral components on the linear photodetector 160. As a result, the optical path of the spectrometer 100 is rather long. Accordingly, the size of the conventional spectrometer tends to be large. On the other hand, since a large amount of light can enter into the conventional spectrometer, the influence of stray light is relatively small. Thus, it may not be necessary to consider the issue of stray light influence on the signal for detection in conventional spectrometers.

SUMMARY

Therefore, an object of the present invention is to provide a miniature spectrometer with a stray light filtering structure which can block stray light from reaching a miniature diffraction grating, thus eliminating the influence of the stray light on the sensing results of the spectrometer.

To achieve this object, the present invention provides a miniature spectrometer having a stray light filtering structure. The miniature spectrometer comprises an input unit, a stray light filtering structure, and a miniature diffraction grating. The input unit receives a first optical signal and a second optical signal. The stray light filtering structure filters out the second optical signal, and has a first filter section and a second filter section. The first filter section has a first dentate structure. The second filter section has a second dentate structure disposed opposite to the first dentate structure. The first dentate structure and the second dentate structure are configured to define an optical channel for the transmission of the first optical signal while causing the second optical signal to enter into the first dentate structure or the second dentate structure to be filtered out. The miniature diffraction grating receives the first optical signal after the first optical signal passes through the stray light filtering structure, and separates the first optical signal into a plurality of spectral components.

Detailed description of select embodiments of the present invention is provided below with reference to the attached figures to aid better understanding of the present invention.

NUMERICAL REFERENCES

Figure 1:
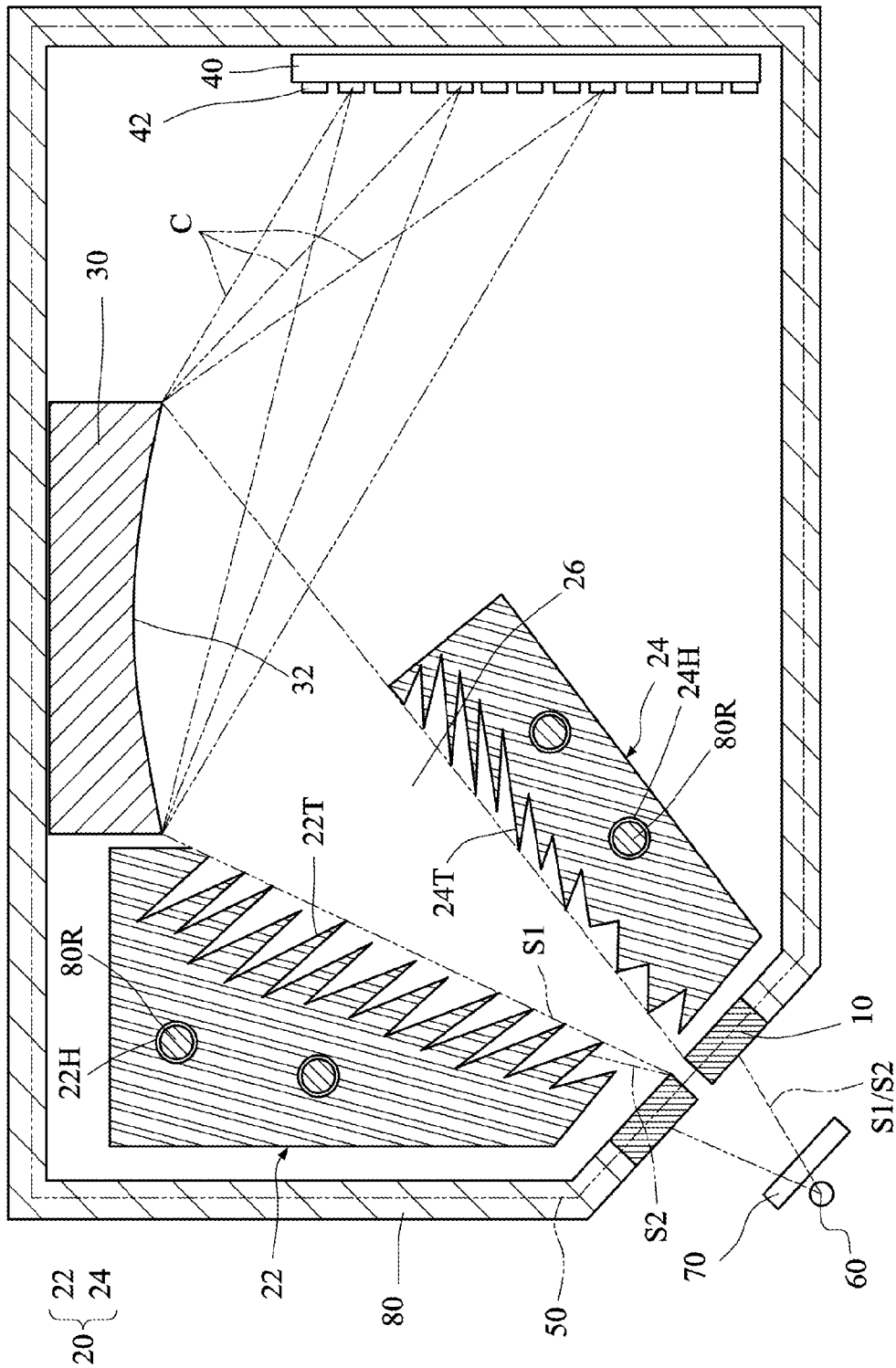
FIG. 1 is a top view of a miniature spectrometer with a stray light filtering structure in accordance with a preferred embodiment of the present invention.

C: spectral components
H: Height
RC: Rowland circle
S1: first optical signals
S2: second optical signals
10: input unit
20: stray light filter
21: first smooth side wall
22: first filtering section
22T: first dentate structure
22H, 24H: positioning hole
23: second smooth sidewall
24: second filtering section
24T: second dentate structure
26: optical channel
30, 30': miniature diffraction grating
32: diffraction pattern
40: photodetector
50: waveguide
52: first waveguide plate
54: second waveguide plate
60: light-emitting device
70: sample
80: housing
80R: positioning post
100: spectrometer
110: light source 120: input unit
130: collimating lens
140: plane grating
142: diffraction pattern
150: focusing lens
160: linear photodetector
200: optical signals

DETAILED DESCRIPTION OF PREFERRED EMBODIMENTS

Figure 2:
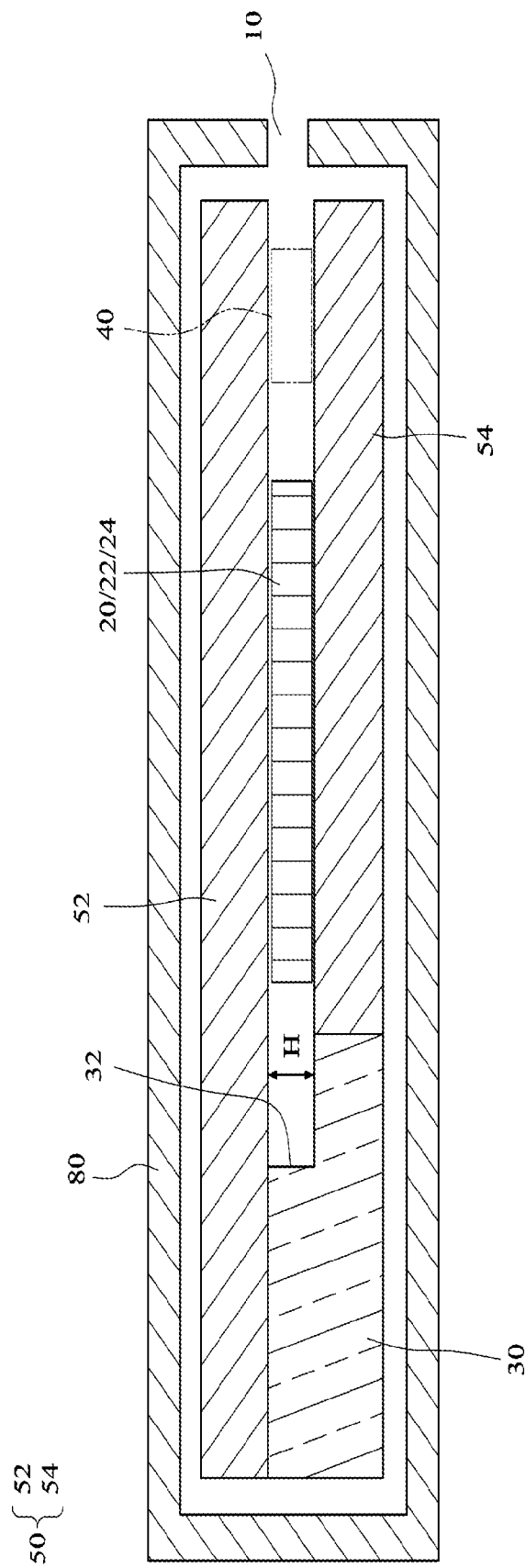
FIG. 2 is a side view of a miniature spectrometer in accordance with a preferred embodiment of the present invention.

FIG. 1 is a top view of a miniature spectrometer with a stray light filtering structure in accordance with a preferred embodiment of the present invention. FIG. 2 is a side view of the miniature spectrometer in accordance with the preferred embodiment of the present invention. As shown in FIG. 1 and FIG. 2, the miniature spectrometer of the present invention comprises an input unit 10, a stray light filtering structure 20, and a miniature diffraction grating 30. Of course, the spectrometer may also comprise a photodetector 40, a housing 80, and a light-emitting device 60. The input unit 10, the stray light filtering structure 20, the miniature diffraction grating 30, and the photodetector 40 are mounted inside the housing 80. A macroscopic profile of a diffraction pattern 32 of the miniature diffraction grating 30 includes a curved reflective surface as shown in FIG. 1, rather than a planar surface as in the conventional diffraction grating shown in FIG. 46. The function of the curved reflective surface is to focus the diffracted light from the miniature diffraction grating 30 on the photodetector 40. The light-emitting device 60 may also be mounted inside the housing 80. As the diffraction grating 30 is an ultrathin small piece fabricated by micro-electro-mechanical system (MEMS) manufacturing process, semiconductor manufacturing process, lithography, electroplating and molding (Lithographie GaVanoformung Abformung, LIGA) or other manufacturing processes, it is referred to as a miniature diffraction grating. Accordingly, the spectrometer of the present invention may be referred to as a miniature spectrometer.

The input unit 10 includes, for example, a slit structure that receives a first optical signal S1 and a second optical signal S2. Signal S1 is an optical signal for detection-by entering into the miniature spectrometer of the present invention within a predefined angle and reaching the miniature diffraction grating 30 directly (see FIG. 1). Signal S2 is an optical signal that enters into the miniature spectrometer at an angle outside the predefined angle. If not filtered out, signal S2 will reach the miniature diffraction grating 30 at one or more unpredictable angles after multiple reflections or after travelling through unknown optical paths (see FIG. 1). Signal S2 might originally be a part of the optical signal for detection, but becomes unusable stray light after having travelled through the aforementioned paths. The stray light filtering structure 20 may be disposed between the input unit 10 and the miniature diffraction grating 30 to filter out the second optical signal S2. The stray light filtering structure 20 includes a first filter section 22 and a second filter section 24.

The first filter section 22 has a thin sheet-like structure with a first dentate structure 22T. The second filter section 24 has a thin sheet-like structure with a second dentate structure 24T. The second dentate structure 24T and the first dentate structure 22T are disposed opposite to one another. The first dentate structure 22T and the second dentate structure 24T define an optical channel 26 therebetween, through which the first optical signal S1 can reach the miniature diffraction grating 30 after passing through the input unit 10 at an appropriate, predefined angle. The first dentate structure 22T and the second dentate structure 24T include numerous sharp protrusions for blocking the second optical signal S2 (i.e., stray light) and guiding the second optical signal S2 into notches among the sharp protrusions to prevent the second optical signal S2 from reaching the miniature diffraction grating 30 via various unpredictable paths. The first filter section 22 and the second filter section 24 are disposed on the same plane.

The miniature diffraction grating 30 receives the first optical signal S1 after the first optical signal S1 passes through the stray light filtering structure 20, and separates the first optical signal S1 into a plurality of spectral components C.

To obtain the spectral components C for processing, the photodetector 40 is used to receive the spectral components C. After subsequent processing, the spectral components C are converted into digital signals. In the present embodiment, the quantity of the spectral components C that are focused on the photodetector 40 is greater than 2.

In order to facilitate the installation of the stray light filtering structure 20, the housing 80 is provided with a plurality of positioning posts 80R, and the first filter section 22 and the second filter section 24 are provided with a plurality of positioning holes 22H, 24H, respectively. Each of the positioning posts 80R is inserted into a corresponding positioning hole 22H, 24H respectively, such that one positioning post 80R is surrounded by one positioning hole, 22H or 24H, to achieve the positioning effect. It is worth noting that the first filter section 22 and the second filter section 24 may be formed as a monolithic piece.

The light-emitting device 60 emits a beam of light that passes through a sample 70 to generate the first optical signal S1 and the second optical signal S2. The sample may be a testing strip or an analyte, for example.

In addition, the miniature spectrometer may further comprise a waveguide device 50 having a first waveguide plate 52 and a second waveguide plate 54 facing one another to define the optical channel 26 along with the input unit 10, the stray light filter 20, and the miniature diffraction grating 30, so that the first optical signal S1 can be reflected by and transmitted through the optical channel 26. Given that a small amount of light enters into the miniature spectrometer, the waveguide device 50 is used to reduce the amount of optical loss and to filter out stray light in combination with the stray light filtering structure 20.

With respect to the so-called miniature spectrometer, the miniature diffraction grating 30 is fabricated by micro-electro-mechanical system (MEMS) or semiconductor manufacturing process. The height of the diffraction pattern 32 in the miniature diffraction grating 30 is typically in a range from approximately a few tens of microns to hundreds of microns. Thus, the thickness of each of the first filter section 22 and the second filter section 24 is also adopted to be in a range from tens of microns to hundreds of microns to form the optical channel 26 of a height H that is in the range from tens of microns to hundreds of microns. Unlike conventional spectrometers into which a relatively large amount of light can enter, a small amount of light can enter into the miniature spectrometer. When there is a large amount of incident light, or light that enters into the spectrometer, the influence of stray light on the diffraction results is rather small, and thus there is less concern about stray light with respect to conventional spectrometers. However, when the amount of incident light is small, filtering stray light out becomes very crucial. During the research and development stage of the present invention, the inventor realized this problem and thus proposes the highly efficient stray light filtering structure to solve this problem. Good experimental results have been achieved.

Figure 3:
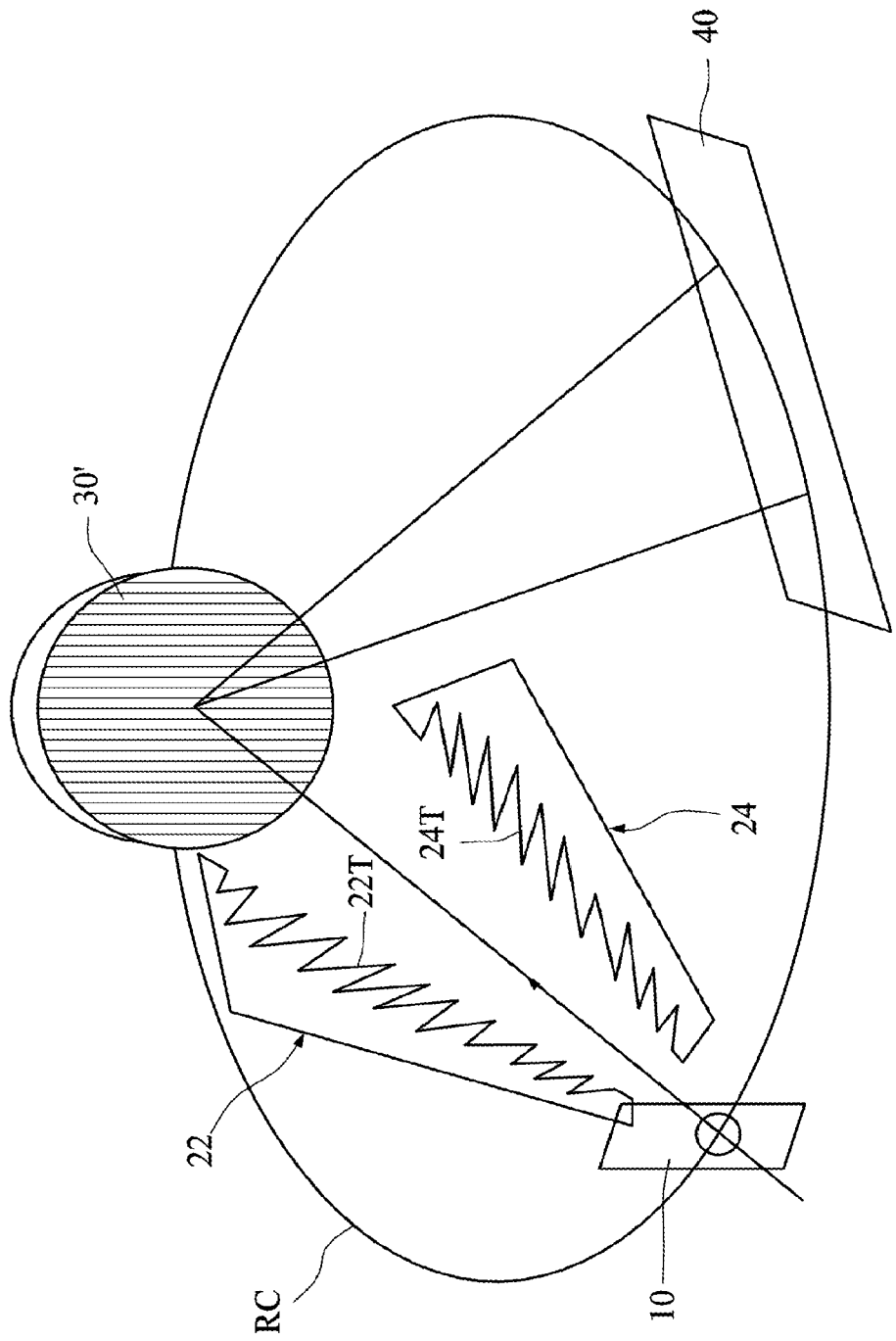
FIG. 3 is a perspective view of another spectrometer of the present invention.

FIG. 3 is a schematic diagram of a miniature spectrometer of the present invention using the well-known Rowland circle theory to explain why an incident light can be focused on the photodetector of the present invention as a straight line. As shown in FIG. 3, according to the Rowland circle theory, after the incident light passes through a slit structure 10, unnecessary components in the incident light are filtered out by a stray light filtering structure 20. Afterwards, the incident light reaches a miniature diffraction grating 30'. The miniature diffraction grating 30' diffracts the incident light to be focused on the Rowland circle RC. Thus, a photodetector 40 intersecting with the Rowland circle RC can receive at least two spectral components. Since the diffraction pattern of the miniature diffraction grating 30' suitable for the Rowland circle has fixed, or equal, pitches, the spectral components can be focused at two points on a straight line. As the size of the Rowland circle can be changed by varying the pitch, when the diffraction pattern were designed to have unequal pitches, at least three spectral components can be focused on a straight line when the diffraction pattern is designed with unequal pitches to achieve the result as shown in FIG. 1.

Therefore, the photodetector 40 of FIG. 1 may have a plurality of photosensitive units 42 such as, for example, two, three or more, arranged in a straight line.

It is worth mentioning again that, other than noise, stray light signals may also include optical signals for detection that are incident at incorrect angles. When there is no stray light filtering structure 20, after passing through the input unit 10, such optical signals incident at incorrect angles are reflected several times by the housing before reaching the miniature diffraction grating 30, thus interfering with the diffraction results. Additionally, stray light filtering structure 20 may be mounted between the miniature diffraction grating 30 and the photodetector 40.

Figure 4:
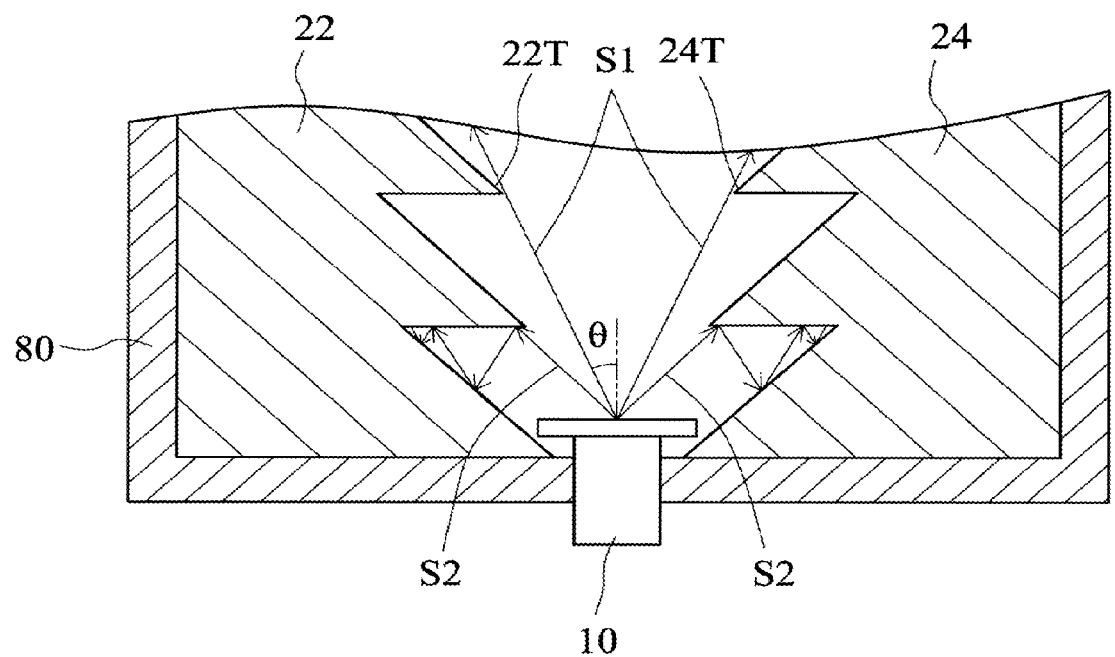
FIG. 4 is a schematic diagram illustrating the filtering principle of a stray light filtering structure.

FIG. 4 is a schematic diagram of the principle of filtering of the stray light filtering structure. The aforementioned predefined angle is 2θ, which correlates with the first dentate structure 22T of the first filter section 22 and the second dentate structure 24T of the second filter section 24, where the angle θ is measured from an axis perpendicular to a light incident plane of the input unit 10. When the incident angle of the second optical signal S2 is greater than 2θ and the incident angle of the first optical signal S1 is less than 2θ, the first optical signal S1 will not enter into the dentate structures and be diminished by the dentate structures while the second optical signals S2 will enter into one of the triangle notches of the dentate structure and be diminished by being reflected back and forth inside the notch. As a result, the intensity of the second optical signal S2, which would become stray light, can be diminished by the dentate structure. Consequently, more distinct spectral components can be obtained.

Figure 5:
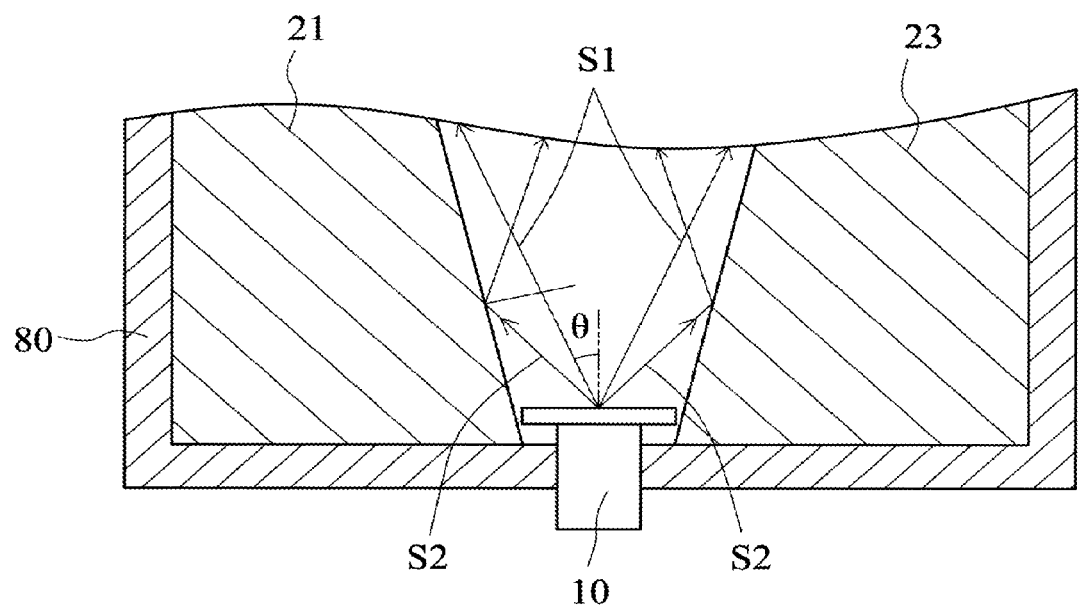
FIG. 5 is a schematic diagram illustrating reflection effects of smooth sidewalls.
Figure 6:
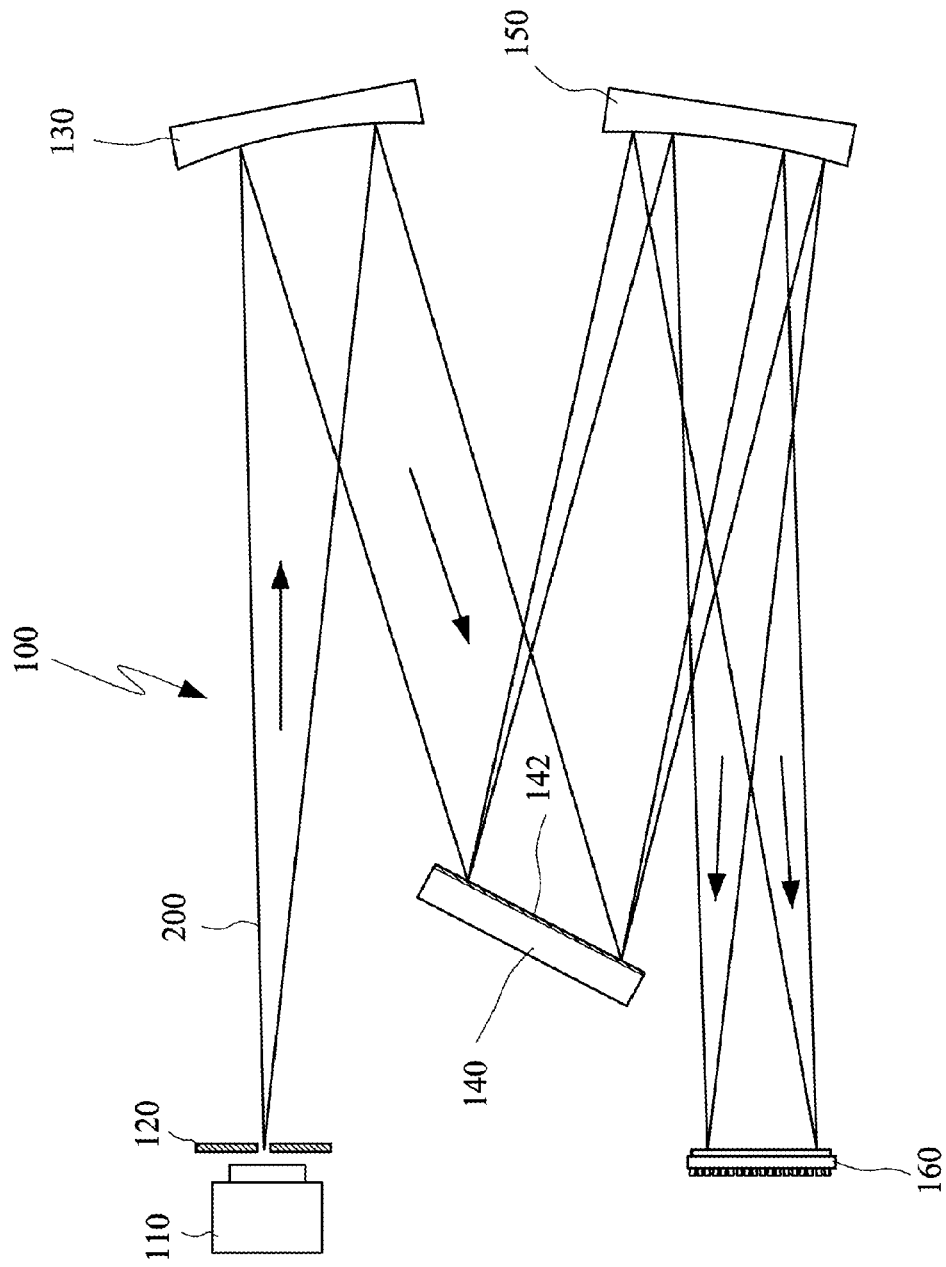
FIG. 6 is a schematic diagram of a conventional spectrometer.

FIG. 5 is a schematic diagram of reflection effects of smooth sidewalls. To prove the function of the stray light filtering structure, the first filter section 22 and the second filter section 24 in FIG. 4 are replaced by a first smooth sidewall 21 and a second smooth sidewall 23, respectively. Since there is no dentate structure on the first smooth sidewall 21 and the second smooth side wall 23, the second optical signal S2 will be reflected by the smooth sidewalls 21 and 23 and move gradually towards the miniature diffraction grating 30, causing interference with the measurement result of the spectrometer.

In the miniature spectrometer of the present invention, the diffraction grating is an ultrathin small piece that can be manufactured by a micro-electro-mechanical system (MEMS) or semiconductor manufacturing process. Generally speaking, the height of the diffraction pattern of the miniature diffraction grating is approximately several tens to hundreds of microns. In order to avoid dispersion of light in free space so that the ultrathin miniature diffraction grating can receive a small amount of optical signals incident on the diffraction pattern having a dimension of a few tens to hundreds microns, the miniature diffraction grating is sandwiched between two waveguide plates, made of a highly reflective material and forming an optical waveguide. After an optical signal enters the miniature spectrometer through the input unit, most of the optical signal (including stray light) can reach the miniature diffraction grating via the waveguide. Nevertheless, the amount of light entering the miniature spectrometer is relatively small compared to that with conventional spectrometers, and when there is only a small amount of light entering the spectrometer, it is imperative to filter out stray light.

Furthermore, the aforementioned predefined angles are determined based on the size and optical path of the grating. In a preferred embodiment, the aforementioned predefined angle is 4 degrees (θ is about 2 degrees on either side). Since a conventional spectrometer typically has a predefined angle of about 10 degrees (θ is about 5 degrees on either side), the predefined angle of the present invention apparently is much smaller. Therefore, it is imperative to filter out stray light.

The spectrometer of the present invention can filter out unwanted stray light components to avoid interference of stray light with the spectral components and eliminate the influence of stray light on the detection results of the photodetector. The thickness of the stray light filtering structure can be quite thin. The stray light filtering structure can be made of metal, plastic or semiconductor materials. When the inventor implemented the present invention according to the configuration shown in FIG. 1, the inventor specifically compared results obtained from a spectrometer having a stray light filtering structure with those obtained from one without such stray light filtering structure, and found that better results can be obtained from the spectrometer with a stray light filtering structure. Therefore, performance of the spectrometer of the present invention can be greatly improved.

Compared with the cone-shaped stray light filtering structure used in traditional optical devices, such as cameras or optical pens, the planar stray light filtering structure of the present invention is particularly suitable for miniature spectrometers.

Form the foregoing it would be appreciated that, although specific embodiments of the present invention have been described for purpose of illustration, by no means they are to be interpreted as limiting the scope of the present invention. Various modifications may be made without departing from the spirit and scope of the present invention.

What is claimed is:

1. A miniature spectrometer, comprising:
   an input unit that receives a first optical signal, that enters into the miniature spectrometer within a predefined angle, and a second optical signal, that enters into the miniature spectrometer outside the predefined angle;
   a stray light filtering structure that filters out the second optical signal, the stray light filtering structure comprising:
      a first filter section having a first dentate structure; and
      a second filter section having a second dentate structure disposed opposite to the first dentate structure,
         wherein the first dentate structure and the second dentate structure are configured to:
            form an optical channel through which the first optical signal passes, and filter out the second optical signal entering into the first or the second dentate structure; and a miniature diffraction grating that receives the first optical signal passed by the stray light filtering structure and separates the first optical signal into a plurality of spectral components.

2. The miniature spectrometer of claim 1, further comprising:
a photodetector that receives the plurality of spectral components.

3. The miniature spectrometer of claim 2, wherein a quantity of the plurality of spectral components focused on the photodetector is greater than 2.

4. The miniature spectrometer of claim 2, wherein the photodetector comprises a plurality of photosensitive units arranged in a straight line.

5. The miniature spectrometer of claim 2, further comprising:
a housing in which the input unit, the stray light filtering structure, the miniature diffraction grating, and the photodetector are disposed.

6. The miniature spectrometer of claim 5, wherein the housing comprises a plurality of positioning posts, wherein the first filter section and the second filter section comprise a plurality of positioning holes, and wherein each of the plurality of positioning posts is surrounded by a respective one of the plurality of positioning holes.

7. The miniature spectrometer of claim 2, further comprising:
a light-emitting device that emits a light that passes through a sample to generate the first optical signal and the second optical signal.

8. The miniature spectrometer of claim 2, further comprising:
a second stray light filtering structure mounted between the miniature diffraction grating and the photodetector to filter out a third optical signal incident within a second predefined angle, wherein optical signals incident within the second predefined angle are stray light signals.

9. The miniature spectrometer of claim 1, wherein the first filter section and the second filter section are disposed on a same plane.

10. The miniature spectrometer of in claim 1, wherein the predefined angle is substantially 4 degrees.

11. The miniature spectrometer of claim 1, wherein the first filter section and the second filter section are one monolithic piece.

12. The miniature spectrometer of claim 1, wherein a macroscopic profile of a diffraction pattern of the miniature diffraction grating includes a curved surface.

13. The miniature spectrometer of in claim 1, further comprising:
a waveguide device having a first waveguide plate and a second waveguide plate disposed opposite to the first waveguide plate,
wherein the first waveguide plate and the second waveguide plate, together with the input unit, the stray light filter, and the miniature diffraction grating, define the optical channel that reflects and transmits the first optical signal.

14. A miniature spectrometer having a stray light filtering structure, comprising:

an input unit that receives a first optical signal and a second optical signal, the first optical signal entering into the miniature spectrometer within a first predefined angle, the second optical signal entering into the miniature spectrometer outside the first predefined angle;

a miniature diffraction grating that receives the first optical signal passed by the stray light filtering structure and separates the first optical signal into a plurality of spectral components;

a photodetector that receives at least one of the plurality of spectral components; and a stray light filtering structure mounted between the miniature diffraction grating and the photodetector to filter out a third optical signal incident within a second predefined angle, wherein optical signals incident within the second predefined angle are stray light signals, and wherein the stray light filtering structure comprises a first filter section having at least one first protrusion.

15. The miniature spectrometer of claim 14, wherein the photodetector comprises a plurality of photosensitive units arranged in a straight line.

16. The miniature spectrometer of claim 14, wherein a macroscopic profile of a diffraction pattern of the miniature diffraction grating includes a curved surface.

17. The miniature spectrometer of claim 14, wherein the stray light filtering structure further comprises:
a second filter section having at least one second protrusion disposed opposite to the at least one first protrusion of the first filter section, wherein the first filter section and the second filter section form an optical channel through which the plurality of spectral components travel between the miniature diffraction grating and the photodetector.

18. A miniature spectrometer, comprising:
an input unit that receives a first optical signal and a second optical signal, the first optical signal entering into the miniature spectrometer within a predefined angle, the second optical signal entering into the miniature spectrometer outside the predefined angle;

a miniature diffraction grating that receives the first optical signal passed by the stray light filtering structure and separates the first optical signal into a plurality of spectral components; and a stray light filtering structure disposed between the input unit and the grating, the stray light filtering structure comprising:
a first filter section having at least one first protrusion, wherein the first protrusion filters out the second optical signal transmitted at a second incident angle that is outside the predefined angle while not filtering out the first optical signal transmitted at a first incident angle that is within the predefined angle.

19. The miniature spectrometer of claim 18, wherein the predefined angle is substantially 4 degrees.

20. The miniature spectrometer of claim 18, wherein the stray light filtering structure further comprises:
a second filter section having at least one second protrusion opposite the at least one first protrusion, wherein:
the first filter section and the second filter section form an optical channel through which the first optical signal is transmitted, and
the at least one first protrusion and the at least one second protrusion filter out the second optical signal.

* * * * *